United States Patent [19]
Kuwayama et al.

[11] Patent Number: 5,089,903
[45] Date of Patent: Feb. 18, 1992

[54] DISPLAY APPARATUS

[75] Inventors: Tetsuro Kuwayama, Yokohama; Naosato Taniguchi, Atsugi; Yoko Yoshinaga, Machida; Nobuo Kushibiki, Yamato, all of Japan

[73] Assignee: Canon Kabushiki Kaisha, Tokyo, Japan

[21] Appl. No.: 359,561

[22] Filed: Jun. 1, 1989

[30] Foreign Application Priority Data

Jun. 3, 1988 [JP] Japan .................. 63-135634

[51] Int. Cl.⁵ ............................................. G02B 27/14
[52] U.S. Cl. ...................................... 359/15; 359/566; 359/569; 359/634
[58] Field of Search .................. 350/3.61, 3.7, 3.72, 350/162.17, 162.18, 162.2, 162.23, 171, 174

[56] References Cited

U.S. PATENT DOCUMENTS

| | | |
|---|---|---|
| 3,580,655 | 5/1971 | Leith et al. . |
| 4,201,441 | 5/1990 | Matsumoto et al. . |
| 4,330,211 | 5/1982 | Peterson et al. ............... 350/162.17 |
| 4,490,021 | 12/1984 | Moya ............................ 350/162.23 |
| 4,613,200 | 9/1986 | Hartman ........................ 350/174 |
| 4,688,879 | 8/1987 | Fairchild . |
| 4,763,990 | 8/1988 | Wood ............................ 350/174 |
| 4,823,427 | 5/1989 | Nanbe et al. .................. 350/174 |

FOREIGN PATENT DOCUMENTS

| | | |
|---|---|---|
| 0268357 | 5/1988 | European Pat. Off. . |
| 0278395 | 8/1988 | European Pat. Off. . |
| WO87/01211 | 2/1987 | PCT Int'l Appl. . |
| 2197728 | 5/1988 | United Kingdom . |

OTHER PUBLICATIONS

"Backside Diffraction by Relief Gratings," E. Popov, L. Mashev, Optics Communications, vol. 65, No. 2, Jan. 15, 1988, (pp. 97-100).

"Low Dispersion Holographic Mirrors with Very High Diffraction Efficienty", J. Jannson et al., Optical Soc. of America, Abstr. WK8, 1989 Ann. Mtg., p. 1257.

Japanese Abstract, vol. 11, No. 142, Appl. No 60-121154.

*Primary Examiner*—Bruce Y. Arnold
*Assistant Examiner*—J. Ryan
*Attorney, Agent, or Firm*—Fitzpatrick, Cella, Harper & Scinto

[57] ABSTRACT

A display apparatus comprises a display, a first diffraction grating for diffracting light from the display, and a second diffraction grating for diffracting diffracted light from the first diffraction grating, so that a half-width of the first diffraction grating is set to be larger than that of the second diffraction grating.

33 Claims, 5 Drawing Sheets

DISPLAY APPARATUS

BACKGROUND OF THE INVENTION

The present invention relates to a display apparatus and, more particularly, to a display apparatus in which light from a display is directed toward a pupil through a diffraction grating such as a hologram to allow observation of an image displayed on a display.

Head-up displays for displaying an image from a display element through a hologram to be superposed on a forward visual field are conventionally known. Of these displays, in a head-up display apparatus for performing a display using a fluorescent display tube for emitting display light having a wide wavelength range, blurring of an image in the vertical direction caused by the wide wavelength range of the display light must be prevented.

Blurring caused in a display image becomes particularly conspicuous when the display image is displayed at a distance. If a half-width of a hologram wavelength characteristic (i.e. Diffraction Efficiency versus wavelength) is about 10 nm, degradation in image quality is visually observed.

As a means for correcting color dispersion caused by a hologram, Japanese Patent Publication No. 51-5956 (U.S. Pat. No. 3,580,655) discloses a technique for arranging an optical element (e.g., another hologram) for causing color dispersion opposite to that caused by the hologram in an optical path extending to the hologram.

U.S. Pat. No. 4,613,200 discloses an example in which this means is applied to the above-mentioned head-up display, and FIG. 1 shows an apparatus of that U.S. patent.

In the apparatus shown in FIG. 1, a pair of holograms 11 and 35 having a relatively large half-wavelength-width and an identical structure are arranged so that their reflecting surfaces are parallel to each other, thereby directing light from a display (not shown) toward a pupil 51 of an observer.

This apparatus can direct light from the display over the entire visible light region of red, green, and blue toward the pupil 51 without causing the blurring. However, as shown in FIG. 1, it is not easy to arrange the holograms 11 and 35 in a vehicle or the like in a parallel state. In this case, these holograms may be arranged in a non-parallel state to be housed in a narrow space of a cabin of a vehicle. However, the following problem is posed.

In a cabin of a vehicle, the pupil 51 of an observer is set at a position separated by about 800 mm from the position of a front window glass. However, the position of the pupil 51 largely varies depending on a driver's sitting height, movement of a seat in the back-and-forth direction, and the like.

FIG. 2 shows a state wherein wavelengths yielding maximum diffraction efficiencies of holograms 11 and 35 have a difference since the holograms 11 and 35 are arranged in a non-parallel state and the pupil 51 is largely displaced in the vertical direction. As described above, since the holograms 11 and 35 have the same characteristics, the half-widths of their wavelength characteristics are equal to each other. In FIG. 2, in a combination of two holograms (diffraction gratings) each having a half-wavelength-width of 20 nm, the center wavelengths of the holograms have a difference of 5 nm with respect to the pupil which is displaced in the vertical direction.

The amount of display light incident on a pupil is proportional to the product of the diffraction efficiencies of the two holograms. When the difference of 5 nm occurs, the amount of light is decreased by about 35%. To our surprise, the difference of 5 nm is caused by displacement of the pupil by only 30 mm in the vertical direction.

The offset of the center wavelengths appears as unevenness of brightness in a display screen when the pupil 51 is moved in the back-and-forth direction, thus degrading display quality.

Such a problem is conspicuously caused when the half-wavelength-width of the hologram is decreased to be smaller than that of light from a display in order to observe a bright forward visual field.

Therefore, if a conventional display apparatus using the diffraction gratings, e.g., holograms, is mounted in a vehicle or the like, an image on a display cannot always be clearly observed.

SUMMARY OF THE INVENTION

The present invention has been made in consideration of the above problem, and has as its object to provide a display apparatus with which an image on a display can always be clearly observed even if the position of a pupil of an observer varies.

In order to achieve the above object, the display apparatus of the present invention comprises a first diffraction grating for diffracting light from a display and a second diffraction grating for diffracting the light diffracted by the first diffraction grating, wherein the half-width of the first diffraction grating (half-width of a wavelength spectrum of a diffraction efficiency of diffracted light of a predetermined order used for display) is set to be larger than that of the second diffraction grating (half-wavelength-width of a diffraction efficiency of diffracted light of a predetermined order used for display).

Other features and detailed aspects of the present invention will be understood from the following embodiments.

DETAILED DESCRIPTION OF THE PREFERRED EMBODIMENT

Figure 3:
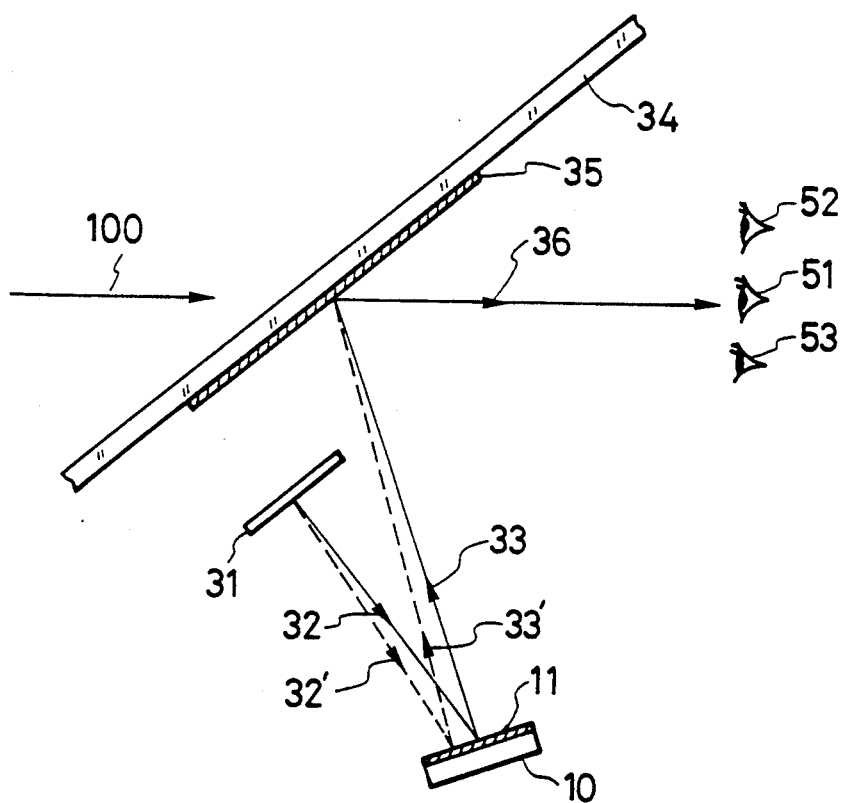
FIG. 3 is a schematic view showing an embodiment of the present invention.

FIG. 3 is a schematic view showing an embodiment of the present invention. A display element (display) 31 such as a fluorescent display tube outputs a light beam having a given wavelength. If a light component corresponding to the center wavelength of this light beam is represented by a solid line 32, this light component is reflected and diffracted by a first volume-phase-type diffraction grating (hologram) 11 formed on a substrate 10 to be converted to a light beam (primary diffracted light) 33. The light beam 33 is then reflected and diffracted by a second volume-phase-type diffraction grating (hologram) 35 formed on a transparent substrate 34 and having a refracting power to be converted to a light beam (primary diffracted light) 36. The display image of the display 31 is thus enlarged and observed by a pupil 51 of an observer. Contrary to this, light components propagating along optical paths 32' and 33' have a slightly larger wavelength than the light beam 32 having the center wavelength.

Upon design of this apparatus, a "reciprocal light beam tracking" technique is employed. The grating pitch and the angle of the diffraction grating 11 with respect to the diffraction grating 35 and the optical path lengths of the light beams 32 and 33 can be set as follows. Assume that light having a larger wavelength than the center wavelength propagates along an optical path 36 extending from the pupil 51 fixed in position. After the light is diffracted by the diffraction grating 35 into the optical path 33' in a direction different from the light having the center wavelength, the diffracted light is dispersed by the diffraction grating 11 having larger wavelength dispersion characteristics in a direction opposite to the diffraction grating 35. As a result, the light beam 32' crosses the light beam 32 on the display 31. With this arrangement, color dispersion correction of the diffraction grating 35 can be satisfactorily realized.

In this embodiment, since the diffraction grating 35 which is transparent with respect to visible light is arranged on the transparent substrate 34, light 100 from a forward visual field passes through the substrate 34 and the diffraction grating 35 and becomes incident on the pupil 51. Therefore, an observer can observe both the forward visual field (landscape) and an image displayed by the display 31 through the diffraction grating 35. When the display apparatus of this embodiment is mounted in a cabin of a vehicle, a front window glass can serve as the substrate 34. The display 31 displays information for assisting an observer, i.e., a driver.

In this embodiment, the diffraction grating 35 is larger than the diffraction grating 11, and (the reflecting surfaces of) the diffraction gratings 11 and 35 are arranged to have a predetermined positional relationship, i.e., in a non-parallel state. The optical path length between the display 31 and the diffraction grating 11 is set to be smaller than that between the diffraction gratings 11 and 35, thus making the entire apparatus compact. The apparatus can be easily housed in the cabin of the vehicle. Since the optical path lengths are set as described above, a viewing zone, where a display can be observed, of the driver ca be widened.

In this embodiment, the peak of the diffraction grating 35 is set to be smaller than that of light from the display 31, so that light 100 from the forward visual field efficiently passes through the diffraction grating 35 and becomes incident on the pupil 51.

As will be described below, the diffraction grating 11 is prepared so that the half-width of the diffraction grating 11 (half-wavelength-width of a wavelength spectrum of a diffraction efficiency of primary diffracted light used for display) is larger than that of the diffraction grating 35 (half-width of a wavelength spectrum of a diffraction efficiency of primary diffracted light used for display).

Assume that the position of the pupil 51 is displaced to an upper or lower pupil position 52 or 53. In this case, the center frequency yielding the maximum diffraction efficiency is shifted toward a short or long wavelength side depending on the characteristic of the diffraction grating 35.

Figure 1:
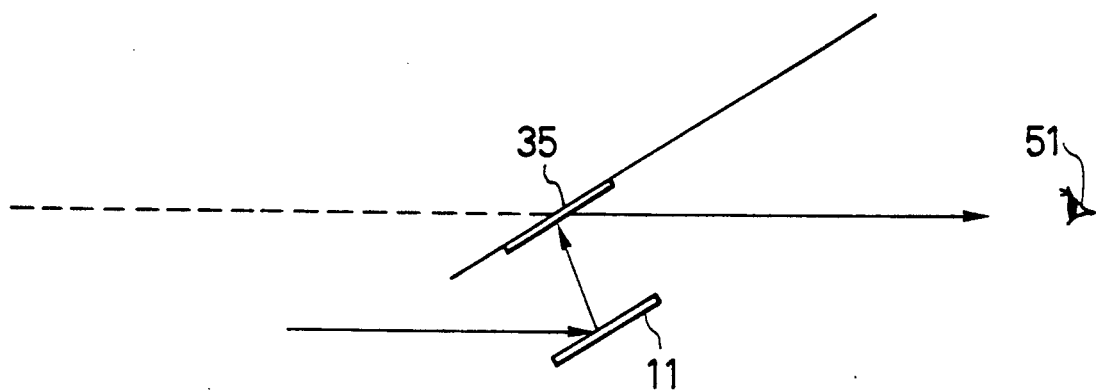
FIG. 1 is a view showing a conventional display apparatus.
Figure 2:
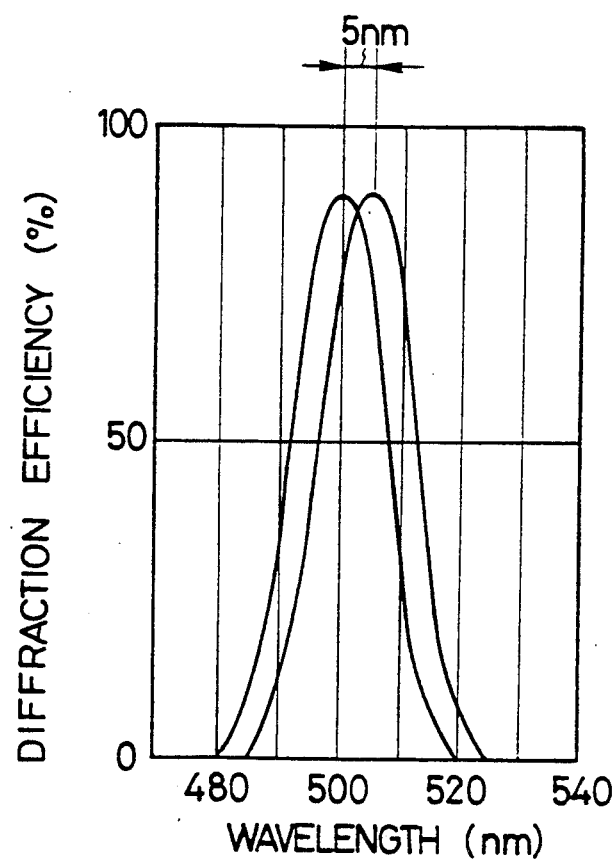
FIG. 2 is a graph showing wavelength characteristics of two holograms.
Figure 4:
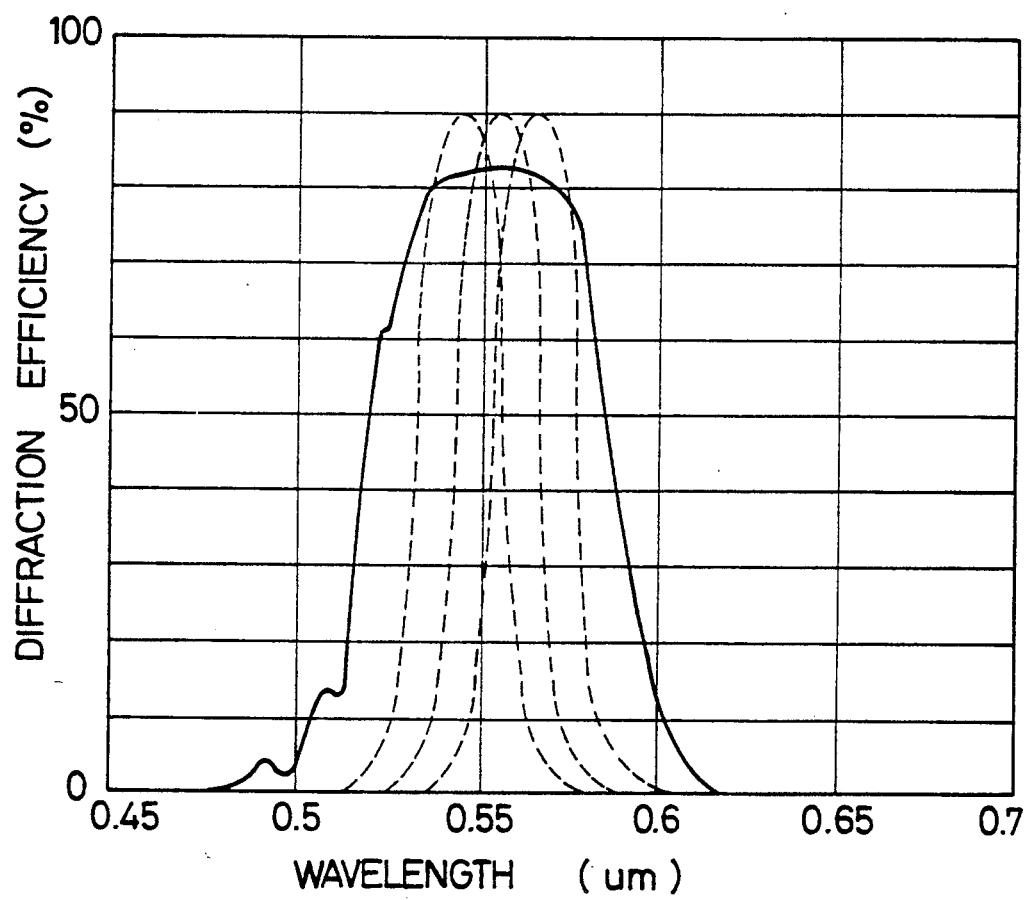
FIG. 4 is a graph showing wavelength characteristics of first and second diffraction gratings of the apparatus shown in FIG. 3.

FIG. 4 simultaneously illustrates the wavelength characteristics (broken curves) of the diffraction efficiency of the primary diffracted light having a half-width of 25 nm of the (second) diffraction grating 35 and the wavelength characteristics of the diffraction efficiency of the primary diffracted light of the (first) diffraction grating 11 in this embodiment. In this embodiment, since the diffraction grating 11 having a flat half-width of over about 40 nm as the wavelength characteristics is used, even if the position of the pupil is changed between the pupil positions 51 to 53 and the center wavelength of light incident on the pupil is varied by ±10 nm, no variation in brightness of a display occurs. This is a great improvement compared to the conventional characteristics shown in FIG. 2 which cause a decrease in light amount by 35% upon variation of the center frequency by 5 nm.

When a variation in center frequency of ±10 nm is permitted, an observation area can be expanded, as follows. Assume that a mean refractive index of the second diffraction grating 35 is 1.65, light having a wavelength of 505 nm from the display 31 is incident on the diffraction grating 35 at an incident angle of 28°, and the incident light is reflected and diffracted at 51°. A grating inclination angle in the diffraction grating 35 is 5.78°, and its mean refractive index is 1.65. The relationship between a Bragg wavelength $\lambda_B$ and a Bragg angle $\phi_B$ can be expressed as:

$$2nd \cos \phi_B = \lambda_B$$

where d is the grating pitch (e.g., 0.166 μm). Assuming that the center wavelength is changed from 505 nm to 495 nm or 515 nm, the Bragg angle $\phi_B$ is changed from 28° to 31° or 20°, and an exit angle into air is changed from 51° to 58° or 45°.

Assuming that the distance from the diffraction grating 35 to the pupil 51 is 800 nm, if the pupil 52 is located above the pupil 51 by 90 mm and the pupil 53 is located below the pupil 51 by 91 mm, the pupil of the observer can sufficiently receive light from the display 31. As a result, when this apparatus is mounted in the cabin, a display of sufficient brightness can be realized for drivers of various sitting heights.

A variation in pupil position, i.e., a variable range of an observation position is almost proportional to a variation amount of the center wavelength. When the diffraction gratings 11 and 35 are designed to permit a large variation amount of the center wavelength, a wider observation position range can be set. Preferably, the half-width of the diffraction grating 11 is set to be larger than the sum of the half-width of the diffraction grating 35 and a variation in center wavelength corresponding to the variation amount of the desired pupil position (observation position).

Figure 5:
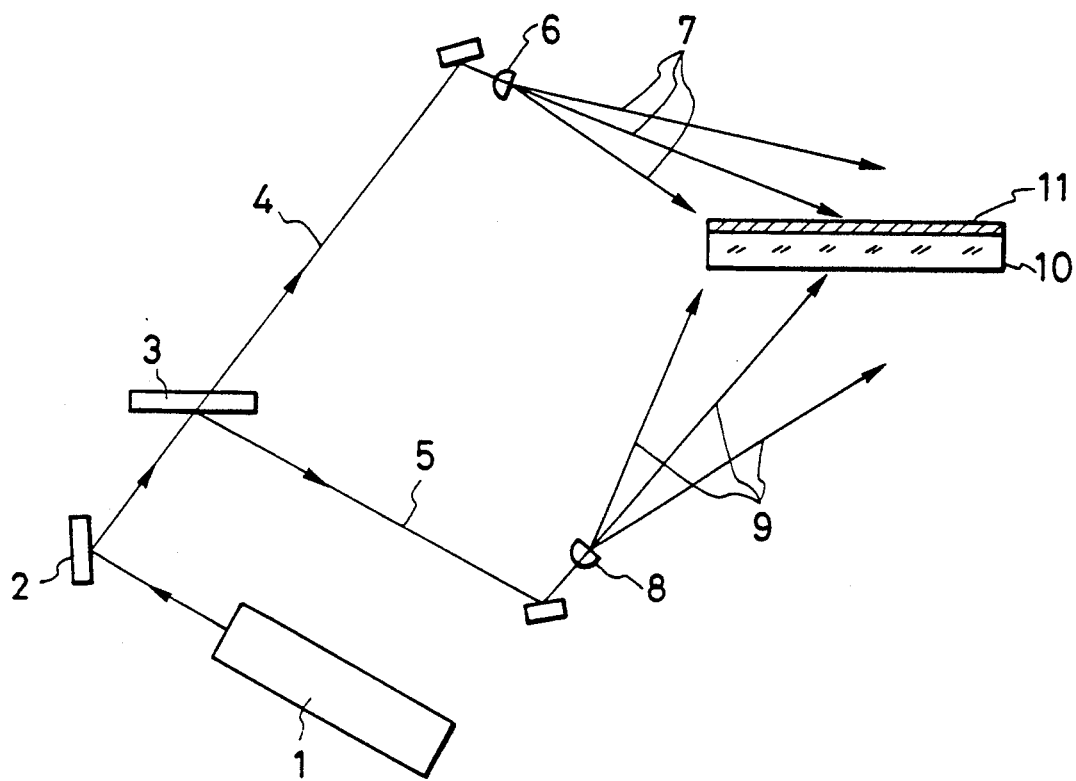
FIG. 5 is a view showing a hologram printing optical system.

FIG. 5 is a view showing an optical system for printing the diffraction grating 11 shown in FIG. 3. Light having a wavelength of 488 nm from an argon laser light source 1 is reflected by a reflecting mirror 2, and is split by a half mirror 3 into light beams 4 and 5. The light beam 4 is diffused by a microscope objective lens system 6 to be converted to a light beam 7, and the light beam 7 becomes incident on a hologram photosensitive material 11 on a substrate 10. On the other hand, the light beam 5 reflected by the half mirror 3 is diffused by a microscope objective lens system 8 to be converted to a light beam 9, and the light beam 7 becomes incident on the hologram photosensitive material 11 through the transparent substrate 10. These light beams 7 and 9 interfere with each other in the hologram photosensitive material 11 to form interference fringes. Incident angles of the two light beams 7 and 9 are selected to be, e.g., 70° and 30°. A parallel beam or converged beam may be used as a printing beam as needed.

As a hologram recording material (photosensitive material 11), a material described in Japanese Patent Publication No. 62-14831 or 62-221152 or Japanese Patent Laid-Open (Kokai) No 53-15154 can be used. Materials and developing conditions will be described below.

2.0 g of polyvinyl carbazole, 0.2 g of carbon tetraiodide, and 20 mg of 2,6-di-tert-butylphenol are dissolved in 25 g of monochlorobenzene. The resultant material is spinner-coated (Mikasa Spinner, 1H-2) on a 1.3-mm thick glass plate with a polished surface in a dark place, and is dried in a dark place to prepare a 6-$\mu$m thick hologram photosensitive material.

Exposure is then performed using the optical system shown in FIG. 5.

The exposure is performed such that the light source 1 emits monochromatic (bluish green) light having a wavelength of 488 nm using an argon ion laser, and the light beams 7 and 9 are incident in an amount of 50 mJ/cm$^2$, respectively.

The exposed photosensitive material is dipped in a trichloroethylene solution at 25° C. for 5 minutes to remove an iodine compound component. Thereafter, the resultant material is dipped in a xylene solution at 36° C. as a swelling solution (first bath) for 60 seconds, and is then dipped in an n-hexane solution at 36° C. as a second bath for 60 seconds. Thereafter, the material is naturally dried. As a result, the reflection/diffraction grating 11 having spectral characteristics indicated by the solid curve in FIG. 4 can be obtained.

If a volume-phase-type hologram of a reflection-type is subjected to a developing treatment under the condition that spectral reflection/diffraction characteristics as described above can be obtained in a wide wavelength range is used as the first diffraction grating 11 in this invention, the following advantages can be obtained. That is, a bright display can be obtained if the center wavelength of the second diffraction grating 35 with respect to the pupil 51 is varied upon variation in observation position, a large-area grating can be easily prepared since it can be formed by optical printing, and the diffraction grating can serve as a concave mirror and can serve to correct astigmatism and coma.

Furthermore, when the volume-phase-type hologram is used, a high diffraction efficiency with respect to both p- and s-polarized light components can be obtained if the hologram is designed so that a light beam incident on a grating alignment surface in a direction substantially perpendicular thereto exits at an angle as large as 15°, 30° or 80°.

In this invention, diffraction gratings of other structures can be used.

Figure 6:
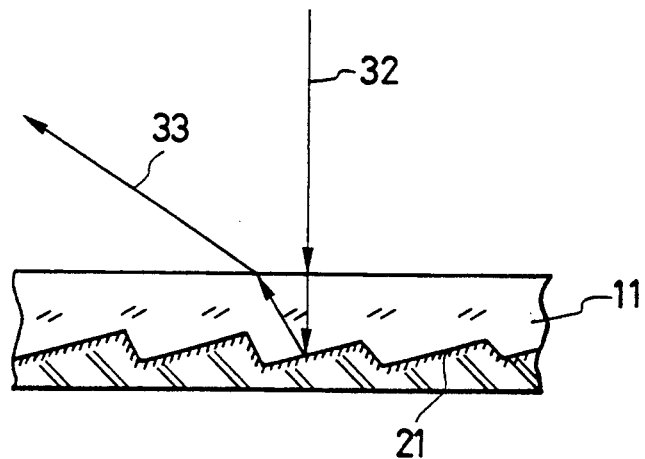
FIG. 6 is a view showing a relief-type diffraction grating.

FIG. 6 shows an example of a so-called "rear-surface relief grating" using a polycarbonate resin having a refractive index n=1.58 as the first diffraction grating (11).

A light beam 32 incident on the diffraction grating 11 which is formed on a surface of a substrate opposite to a light-incidence side is reflected and diffracted by a reflecting surface 21 which is inclined at 16.6° with respect to a horizontal plane, is then refracted in air, and propagates in a 60°-direction as a light beam 33.

Figure 7:
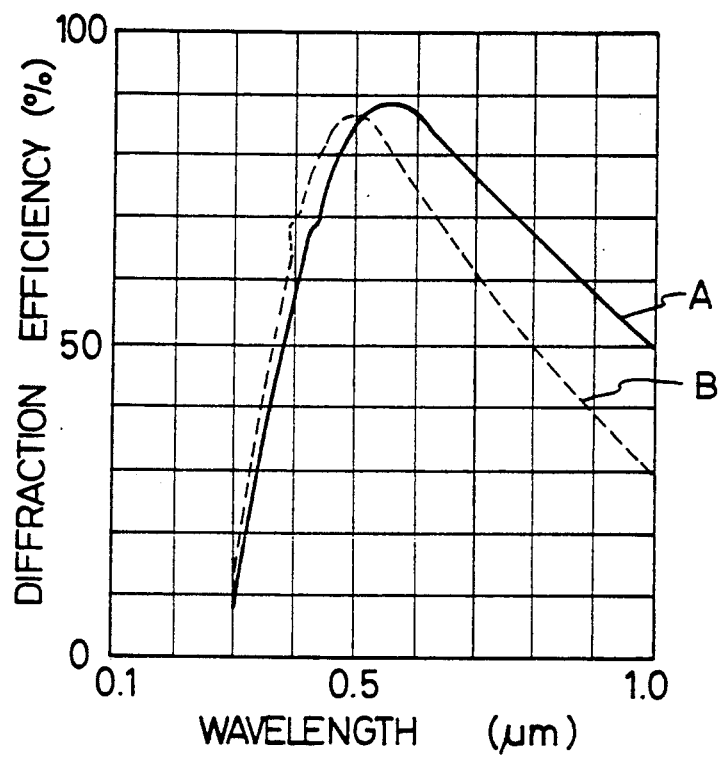
FIG. 7 is a graph showing a diffraction efficiency of a commercially available surface relief-type diffraction grating.

FIG. 7 shows a diffraction efficiency of p- and s-polarized light components of a commercially available diffraction grating formed on a front surface (a surface on a light-incidence side) of a substrate, i.e., when a light beam is incident from air on an inclined surface 21 of the grating in a direction substantially perpendicular thereto and is reflected and diffracted in substantially the perpendicular direction. In FIG. 7, a curve A corresponds to the p-polarized light component, and a curve B corresponds to the s-polarized light component.

In a head-up display apparatus, if its optical arrangement is similar to that of a spectroscope, a commercially available blazed diffraction grating can be used as a grating for correcting a blurred image caused by color dispersion. However, a practical head-up display apparatus has a different optical arrangement from that of a spectroscope.

In FIG. 3, the incident light 32 and the diffracted light 33 define an angle of 20°. When the area of the display 31 is increased to realize a large-screen display and the entire apparatus is made compact, the angle defined by the two beams is preferably set to be larger. However, when the angle defined by the incident light beam and the diffracted light beam is increased, a conventional blazed diffraction grating causes a decrease in efficiency.

One factor of a decrease in diffraction efficiency of the blazed diffraction grating is an "aperture ratio $\gamma$". The aperture ratio $\gamma$ represents a geometrooptical light amount loss at a corner portion of a stepwise diffraction grating, and is given by:

$$\gamma = \cos\theta_2/\cos\theta_1$$

A case will be examined below wherein light is incident on an inclined surface of a diffraction grating in a direction ($\theta_1 = 0°$) perpendicular thereto and emerges in a 60°-direction. In a surface relief diffraction grating placed in air, since the angle $\theta_2 = 60°$, $$\begin{aligned}\gamma(\text{air}) &= \cos 60°/\cos 0° \\ &= 0.5\end{aligned}$$

However, in the polycarbonate resin having the refractive index=1.58 shown in FIG. 6, since $\theta_2=33.2°$, in the element shown in FIG. 6, $$\begin{aligned}\gamma(\text{polycarbonate}) &= \cos 33.2°/\cos 0° \\ &= 0.836\end{aligned}$$

Therefore, the aperture ratio $\gamma$ can be greatly improved.

When the "rear-surface relief grating" shown in FIG. 6 is used for a head-up display for a vehicle, even when the display is used while the incident direction and the exit direction form a large angle, a large aperture ratio γ, i.e., high diffraction efficiency can be obtained.

Another feature is easy protection of the reflecting surface. In a cabin of a vehicle, entrance of dust to some extent cannot be avoided. In the surface relief diffraction grating which is arranged so that the diffraction grating is exposed to air, when dust becomes attached to the grating surface, it is difficult to remove the attached dust. If the dust is to be forcibly removed, the grating surface may be damaged. In the "rear-surface relief diffraction grating", the dust can be removed by cleaning the front surface.

The surface relief diffraction grating can only use a transparent coating material such as SiO₂ for protection of a relief surface, and its thickness must be as small as 0.1 μm or less. In contrast to this, the "rear-surface relief grating" can use a non-transparent protection material, thus allowing sufficient protection. A transparent material used for the "rear-surface relief grating" includes acryl (refractive index=1.49), and the like.

Figure 8:
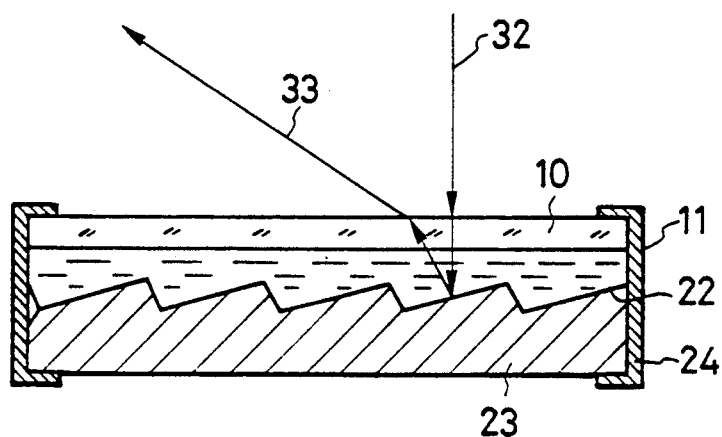
FIG. 8 is a view showing a modification of the relief-type diffraction grating.

The rear-surface relief diffraction grating 11 shown in FIG. 6 can be variously modified. FIG. 8 shows an example wherein the rear-surface relief grating" is constituted by using the surface relief diffraction grating and a liquid having a proper refractive index. A liquid 11 having a proper refractive index is filled on a grating surface 22 of a surface relief diffraction grating 23, and is covered with a transparent flat plate 10. The entire structure is housed in a case 24 to prevent leakage of the liquid.

With this structure, the design margin can be widened. More specifically, since the liquid can be prepared by mixing various materials, the relief grating having a refractive index which cannot be achieved by a single material can be realized. The refractive index of the liquid is finely adjusted in accordance with the final optical arrangement, and a display and the diffraction grating to be combined, so that a maximum diffraction efficiency can be obtained with respect to a target wavelength. When water which is most easily available is used, its refractive index is 1.33, and a "rear-surface relief diffraction grating " can be constituted at very low cost. A medium for the "rear-surface relief grating" preferably has a refractive index of 1.3 or more.

In the above embodiment, the first diffraction grating for correcting blurring of a display image caused by color dispersion of the second diffraction grating (hologram) has a larger half-width maximum than that of the diffraction efficiency of the second diffraction grating. Therefore, when an observation position (pupil position) is varied over the entire screen, a bright display can always be obtained.

In particular, when the volume-phase-type hologram of the reflection-type or the "rear-surface relief diffraction grating" is used as the first diffraction grating, a high diffraction efficiency can be realized with respect to a necessary display visual field.

In the above description, the second diffraction grating (hologram) is arranged on a flat surface of the substrate. However, as can be seen from the above description, the second diffraction grating may be arranged on a spherical or cylindrical surface. In the above description, the display comprises a fluorescent display tube (half-width=150 nm). However, any other displays may be used as long as they have a sufficiently wide wavelength range. The method of forming the first diffraction grating (11) shown in FIG. 3 has been described in detail above. The second diffraction grating (35) shown in FIG. 3 can be formed by a holographic method as in the diffraction grating (11). Although the diffraction grating (35) has a refracting power, it is easy to form such a diffraction grating.

As can be seen from the description of the several embodiments, the display apparatus of this embodiment can be preferably used for an apparatus mounted in a vehicle (automobile) but may be applied to various other vehicles or to other applications. The present invention is not limited to the structures and arrangement of the two diffraction gratings, and apparatuses of various structures may be provided within the spirit and scope of the invention.

We claim:

1. A display apparatus comprising:
   a display;
   a first diffraction grating for diffracting light emitted from said display, said first diffraction grating having a diffraction efficiency with a first wavelength spectrum and the diffracted light having a center wavelength; and
   a second diffraction grating for diffracting diffracted light from said first diffraction grating toward a pupil of an observer, with a half-width of the first wavelength spectrum of said first diffraction grating being larger than a sum of a half-width of a second wavelength spectrum of a diffraction efficiency of said second diffraction grating and a variation amount of the center wavelength of the diffracted light directed toward the pupil, wherein the variation amount varies in accordance with variation of the position of the pupil.

2. An apparatus according to claim 1, wherein said first diffraction grating reflectively diffracts light from said display toward said second diffraction grating.

3. An apparatus according to claim 2, wherein said first diffraction grating comprises a hologram.

4. An apparatus according to claim 2, wherein said first diffraction grating comprises a relief grating.

5. An apparatus according to claim 1, wherein said second diffraction grating comprises a hologram.

6. An apparatus according to claim 5, wherein said first diffraction grating exhibits color dispersion opposite to that caused by said hologram.

7. An apparatus according to claim 1, wherein the optical path length between said display and said first diffraction grating is set to be smaller than that between said first and second diffraction gratings.

8. An apparatus according to claim 7, wherein a size of said second diffraction grating is set to be larger than that of said first diffraction grating.

9. An apparatus according to claim 8, wherein said second diffraction grating reflectively diffracts the diffracted light from said first diffraction grating toward a pupil and allows other light components to pass therethrough toward said pupil.

10. An apparatus according to claim 9, wherein said second diffraction grating comprises a volume-type hologram.

11. A display apparatus comprising:
    a display;
    a beam combiner having a diffraction grating for diffracting light emitted from said display toward a pupil; and
    diffracting means, arranged in an optical path between said display and said beam combiner and having a diffraction efficiency with a first wavelength spectrum, for directing the light from said display toward said beam combiner, wherein said diffracting means exhibits color dispersion opposite to that caused by said diffraction grating, and a half-width of the first wavelength spectrum of said diffracting means is larger than a sum of a half-width of a second wavelength spectrum of a diffraction efficiency of said diffraction grating and a variation amount of a center wavelength of the diffracted light directed toward the pupil, wherein the variation amount varies in accordance with variation of the position of the pupil.

12. An apparatus according to claim 11, wherein said diffracting means comprises a hologram.

13. An apparatus according to claim 11, wherein said diffracting means comprises a relief diffraction grating.

14. An apparatus according to claim 11, wherein said diffraction grating comprises a hologram.

15. An apparatus according to claim 11, wherein light-receiving surfaces of said diffraction grating and said diffracting means are arranged in a non-parallel state.

16. A display apparatus comprising:
a display;
a first diffraction grating having a smaller half-width of a wavelength spectrum of a diffraction efficiency than a wavelength spectrum of light emitted from said display, with said first diffraction grating diffracting light from said display toward a pupil; and
a second diffraction grating for diffracting the light emitted from said display toward said first diffraction grating, said second diffraction grating having a larger half-width of the wavelength spectrum of a diffraction efficiency than a sum of a half-width of the wavelength spectrum of said first diffraction grating and a variation amount of a center wavelength of the light directed toward said pupil, wherein the variation amount varies in accordance with variation of the position of the pupil.

17. An apparatus according to claim 16, wherein said second diffraction grating exhibits color dispersion opposite to that caused by said first diffraction grating.

18. An apparatus according to claim 17, wherein each of said first and second diffraction gratings comprises a hologram.

19. An apparatus according to claim 17, wherein said first diffraction grating comprises a hologram, and said second diffraction grating comprises a relief diffraction grating.

20. An apparatus according to claim 17, wherein an optical path length between said display and said second diffraction grating is set to be smaller than that between said first and second diffraction gratings.

21. An apparatus according to claim 20, wherein said first diffraction grating reflectively diffracts the diffracted light from said second diffraction grating toward a pupil and allows other light components to pass therethrough toward said pupil.

22. An apparatus according to claim 21, wherein a size of said first diffraction grating is set to be larger than that of said diffraction grating.

23. A head-up display apparatus comprising:
a display;
a beam combiner having a hologram for reflectively diffracting light from said display toward a pupil; and
a diffraction grating, arranged in an optical path between said display and said beam combiner and having a diffraction efficiency with a first wavelength spectrum, for reflectively diffracting the light from said display toward said beam combiner, said diffraction grating having a larger half-width of the first wavelength spectrum of a diffraction efficiency than a sum of a half-width of a second wavelength spectrum of a diffraction efficiency of said hologram and a variation amount of a center wavelength of said light toward said pupil, wherein the variation amount varies in accordance with variation of the position of the pupil.

24. An apparatus according to claim 23, wherein said hologram has a refracting power.

25. An apparatus according to claim 24, wherein said hologram comprises a volume-type hologram.

26. An apparatus according to claim 25, wherein said diffraction grating comprises a relief grating.

27. An apparatus according to claim 26, wherein said relief grating is formed on a surface of a transparent plate opposite to a surface thereof on a light-incidence side, and a refractive index of said plate is set to be not less than 1.3.

28. An apparatus according to claim 23, wherein said diffraction grating comprises a volume-type hologram.

29. An apparatus according to claim 23, wherein said diffraction grating corrects color dispersion caused by said hologram.

30. An apparatus according to claim 29, wherein an optical path length between said display and said diffraction grating is set to be smaller than that between said diffraction grating and said hologram.

31. An apparatus according to claim 30, wherein the size of said hologram is set to be larger than that of said diffraction grating.

32. An apparatus according to claim 23, wherein a said hologram is provided to a front window glass of a vehicle.

33. A display apparatus for displaying an image on a front glass of a vehicle, comprising:
a display for emitting light;
a first diffraction grating for diffracting light emitted from said display, with said first diffraction grating having a diffraction efficiency with a first wavelength spectrum and the diffracted light having a center wavelength; and
a second diffraction grating for diffracting diffracted light from said first diffraction grating toward a pupil of a driver, said second diffraction grating toward a pupil of a driver, said second diffraction grating being arranged near the front glass, wherein a half-width of the first wavelength spectrum of said first diffraction grating is larger than a sum of a half-width of a second wavelength spectrum of a diffraction efficiency of said second diffraction grating and a variation amount of the center wavelength of said diffracted light toward the pupil, wherein the variation amount varies in accordance with variation of the position of the pupil.

* * * * *